United States Patent [19]

Yatka et al.

[11] Patent Number: 5,120,551
[45] Date of Patent: Jun. 9, 1992

[54] LOW MOISTURE SUGARLESS SYRUPS WITH MALTITOL FOR CHEWING GUM

[75] Inventors: Robert J. Yatka, Orland Park; Gordon N. McGrew, Evanston, both of Ill.

[73] Assignee: Wm. Wrigley Jr. Company, Chicago, Ill.

[21] Appl. No.: 632,312

[22] Filed: Dec. 21, 1990

[51] Int. Cl.$^5$ .............................................. A23G 3/30
[52] U.S. Cl. ......................................... 426/3; 426/548; 426/658; 426/804
[58] Field of Search ........................... 426/3-6, 426/548, 658, 804

[56] References Cited

U.S. PATENT DOCUMENTS

| | | |
|---|---|---|
| 4,156,740 | 5/1979 | Glass et al. . |
| 4,271,197 | 6/1981 | Hopkins ................................. 426/3 |
| 4,372,942 | 2/1983 | Cimiluca . |
| 4,466,983 | 8/1984 | Cifrese et al. . |
| 4,671,961 | 6/1987 | Patel et al. ............................. 426/3 |
| 4,671,967 | 6/1987 | Patel et al. ............................. 426/3 |
| 4,675,293 | 6/1987 | Gibs ....................................... 426/3 |
| 4,728,515 | 3/1988 | Patel et al. ............................. 426/3 |
| 4,738,854 | 4/1988 | Friello et al. ........................... 426/3 |
| 4,753,806 | 6/1988 | Carroll et al. .......................... 426/3 |
| 4,774,094 | 9/1988 | Carroll et al. .......................... 426/3 |
| 4,800,095 | 1/1989 | Carroll et al. . |
| 4,933,188 | 6/1990 | Cherukuri ............................... 426/3 |
| 5,034,231 | 7/1991 | Yakta et al. . |

FOREIGN PATENT DOCUMENTS

| | | |
|---|---|---|
| 0196640 | 10/1986 | European Pat. Off. . |
| 0196641 | 10/1986 | European Pat. Off. . |
| 0323442 | 7/1989 | European Pat. Off. . |
| 2631831 | 12/1989 | France . |

*Primary Examiner*—Jeanette Hunter
*Attorney, Agent, or Firm*—Willian Brinks Olds Hofer Gilson & Lione

[57] ABSTRACT

A low moisture sugarless syrup for use in chewing gums, methods of making the syrup, chewing gums using the syrup, and methods for making such chewing gums are disclosed. The syrups comprise from about 10% to about 40% of a plasticizer selected from the group consisting of glycerin, propylene glycol and mixtures thereof; from about 40% to about 85% alditols with at least 65% of the alditols (by weight of the alditols) consisting of maltitol; and from about 5% to about 35% water.

20 Claims, No Drawings

LOW MOISTURE SUGARLESS SYRUPS WITH MALTITOL FOR CHEWING GUM

BACKGROUND OF THE INVENTION

The present invention relates generally to improved chewing gum compositions including improved carbohydrates syrup compositions and methods of preparation of the chewing gum compositions and syrups.

The use of carbohydrate syrups in chewing gums is well known in the art. In particular, relatively low D.E. (Dextrose Equivalent) carbohydrate syrups are especially desirable for the texture and binding effects which the solids in such syrups provide in certain applications. Many common carbohydrate syrups include high moisture levels which are unsatisfactory in chewing gums for a number of reasons, thus the prior art teaches that the moisture level in such syrups may be reduced. For example, U.S. Pat. Nos. 4,671,961; 4,671,967 and 4,728,515 (each of which are hereby incorporated by reference) disclose compositions in which a plasticizer such as glycerin or propylene glycol is added to a carbohydrate syrup and the syrup is evaporated to reduce the moisture content originally associated with a carbohydrate syrup.

In sugarless gum applications, a commonly used carbohydrate syrup is supplied by the Roquette Corporation of New York, N.Y. under the brand name of Lycasin hydrogenated starch hydrolysate syrup. The syrup contains about 25% water. The carbohydrate distribution of Lycasin hydrogenated starch hydrolysate (HSH) solids is about 6% oligosaccharides of a DP of 1 (sorbitol), about 52% with a DP of 2 (maltitol), about 18% with a DP of 3, about 1.5% with a DP of 4, about 2% with a DP of 5, about 3.7% with a DP of 6, about 3.4% with a DP of 7, about 2.2% with a DP of 8, about 1.0% with a DP of 9, and about 11% with a DP of 10 or greater. The above listed patents disclose the use of Lycasin or similar HSH syrups mixed with glycerin and evaporated to a low moisture level. Such syrups have been used for sometime in chewing gum. A common syrup has about 67.5% HSH solids, 25% glycerin and 7.5% water. The syrup has been found useful to provide desirable texture and binding effects in making sugarless gums.

Because gums are sold through commercial distribution channels, they must have an acceptable shelf-life. One area of constant concern is the hydroscopic nature of chewing gum. When formulated, the gum will have a desired level of moisture to make the gum soft yet not sticky. However, during commercial distribution and storage, the gum may either pick up or lose moisture, depending on the gum composition and the relative humidity in the surrounding environment. Of course, expensive packaging may be used to prevent or retard water migration to or from the gum. However, once the package is opened, the gum may quickly begin to pick up or lose moisture. Therefore, it would be desirable to formulate a gum composition which has stable moisture properties. More importantly, it would be preferable to have a gum which would retain moisture in dry climates and at the same time not pick up moisture in wet climates.

SUMMARY OF THE INVENTION

The present invention is directed to gum compositions utilizing an improved low moisture sugarless syrup containing maltitol, methods of preparing such gums and syrups, and the syrups themselves. According to one aspect of the present invention, a low moisture syrup for use in chewing gum comprises from about 10% to about 40% of a plasticizer selected from the group consisting of glycerin, propylene glycol and mixtures thereof; from about 40% to about 85% alditols with at least 60% of the alditols (by weight of the alditols) consisting of maltitol; and from about 5% to about 35% water.

Another aspect of the invention is a process for preparing a chewing gum composition comprising the steps of providing a syrup comprising from about 10% to about 40% of a plasticizer selected from the group consisting of glycerin, propylene glycol and mixtures thereof; from about 40% to about 85% alditols, with at least 60% of the alditols (by weight of the alditols) consisting of maltitol; and from about 5% to about 35% water; providing a chewable gum base, a bulking agent selected from the group consisting of sugar, sugar alcohols and mixtures thereof; optional flavors, artificial sweeteners, colors, preservatives and processing aids; and combining the gum base in an amount from about 10% to about 60% by weight of the chewing gum composition, the bulking agent in an amount from about 20% to about 70% by weight of the chewing gum composition, the syrup in an amount from about 4% to about 25% by weight of the chewing gum composition and the optional ingredients to form a finished chewing gum composition.

Tests with preferred embodiments of the gum composition have shown that the gum picks up less moisture in high humidity environments and loses less moisture in low humidity environments than gums made from the prior art syrup.

DETAILED DESCRIPTION OF THE PRESENTLY PREFERRED EMBODIMENTS

Syrups of the present invention are low moisture sugarless syrups intended for use in chewing gum. The syrups comprise an alditol or mixture of alditols, including at least 60% maltitol by weight of the alditols, a hydrophilic plasticizer and water. Glycerin and propylene glycol are preferred plasticizers. The alditols used and their levels of use are limited by their water solubility. However, if the syrup is maintained at elevated temperatures between manufacture and use, or if it is heated before use, then the solubility limits may be exceeded. However, preferably the syrups will be formulated to be stable at normal shipment and storage temperatures. If prolonged heating is used, care must be taken not to evaporate too much water, or to replace water if it is evaporated, so that the product does not crystallize before it is used. The following is a list of useful alditols and their solubilities in water.

| Alditol | % Solubility at 20° C. (w/w) |
|---|---|
| sorbitol | >70% |
| mannitol | 15 |
| xylitol | 63 |
| lactitol | 55 |
| maltitol | >50 |
| high maltitol HSH solids (Lycasin) | >85 |
| palatinit (isomaltutol) | 25 |

The syrups of the present invention can be prepared in any suitable manner. Where the alditol or alditols are in powdered form, a preferred method is to preblend the water and plasticizer, then slowly add the alditol(s) with heat and stirring.

If the alditol(s) are already in the form of a solution, the preferred method is to add the plasticizer first, then evaporate the syrup down to the desired moisture level, if necessary, using a stirred kettle or other well-known evaporation method.

Of course, any effective means of preparing the syrup can be used.

The syrups of the present invention will fall into the ranges shown below:

| Component | Broad Range | Preferred Range |
|---|---|---|
| Alditol(s) (dry solids) | 40–85% | 55–75% |
| Plasticizer | 10–40 | 15–25 |
| Water | 5–35 | 5–15 |

Of course, the exact levels of the three basic components will depend on the alditol(s) chosen and the desired properties of the syrup.

In addition, the alditol component must include at least 60%, by weight of the alditols, of maltitol. Preferably, the amount of maltitol will be greater than 65% of the total alditols. Most preferably, the maltitol will comprise about 70% or more of the alditols. The use of these high levels of maltitol has been found experimentally to give gums made with syrups containing the required amount of maltitol superior hygroscopic properties, surprisingly in both low and high relative humidity conditions.

An example of the syrup of the present invention and its method of preparation is as follows.

EXAMPLE 1 (SYRUP)

| 85% solids Lycasin HSH syrup | 50.0% |
|---|---|
| 99% glycerin | 25.0 |
| maltitol powder | 25.0 |
|  | 100.0% |

The two liquids were blended with gentle heating and the maltitol was added slowly. The maltitol was completely dissolved upon initial mixing.

Most chewing gum formulations may benefit from the present invention. However, sugarless formulations are preferred. As was used herein, the term chewing gum includes chewing gum, bubble gum and the like. All percents are given in weight percent unless specified otherwise.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer and styrene butadiene rubber, as well as natural latexes such as chicle. Resins include polyvinyl acetate and terpene resins. Fats and oils may also be included in the gum base, including tallow, hydrogenated and partially hydrogenated vegetable oils, and cocoa butter. Commonly employed waxes include paraffin, microcrystalline and natural waxes such as beeswax and carnauba. According to the preferred embodiment of the present invention, the insoluble gum base constitutes between about 5 to about 80 percent by weight of the gum. More preferably the insoluble gum base comprises between 10 and 60 percent by weight of the gum and most preferably about 20 to about 35 percent by weight of the gum.

The gum base typically also includes a filler component. The filler component may be calcium carbonate, magnesium carbonate, talc, dicalcium phosphate or the like. The filler may constitute between about 5 and about 60 percent by weight of the gum base. Preferably, the filler comprises about 5 to about 50 percent by weight of the gum base.

Gum bases typically also contain softeners, including glycerol monostearate and glycerol triacetate. Further, gum bases may also contain optional ingredients such as antioxidants, colors, and emulsifiers. The present invention contemplates employing any commercially acceptable gum base.

The water-soluble portion of the chewing gum may further comprise sweeteners, softeners, flavoring agents and combinations thereof. The sweeteners often fulfill the roll of bulking agents in the gum. Preferably the sweeteners will be sugarless sweeteners such as sorbitol, mannitol, xylitol, hydrogenated starch hydrolysates, maltitol and the like, alone or in any combination. The syrup of the present invention may have use in sugar gums. In sugar gums, typical bulking agents include sucrose, dextrose, maltose, dextrin, dried invert sugar, fructose, levulose, galactose, corn syrup solids and the like, alone or in combination. The bulking agent generally will comprise from about 5 percent to about 80 percent of the gum composition, and more preferably about 20 percent to about 70% of the gum composition.

Softeners are added to the chewing gum in order to optimize the chewability and mouth feel of the gum. Softeners, also known in the art as plasticizers or plasticizing agents, generally constitute between about 0.5 to about 15.0 percent by weight of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in gum. In the present invention, these softeners are preferably provided by the syrup described above.

A flavoring agent may be present in the chewing gum in an amount within the range of from about 0.1 to about 10.0 weight percent and preferably from about 0.5 to about 3.0 weight percent of the gum. The flavoring agents may comprise essential oils, synthetic flavors, or mixture thereof including, but not limited to, oils derived from plants and fruits such as citrus oils, fruit essences, peppermint oil, spearmint oil, clove oil, oil of wintergreen, anise, and the like. Artificial flavoring components are also contemplated for use in gums of the present invention. Those skilled in the art will recognize that natural and artificial flavoring agents may be combined in any sensorially acceptable blend. All such flavors and flavor blends are contemplated by the present invention.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form, such as by rolling into sheets and cutting into sticks, extruding into chucks or casting into pellets.

Generally, the ingredients are mixed by first melting the gum base and adding it to the running mixer. The base may also be melted in the mixer itself. Color or emulsifiers may also be added at this time. The syrup of the present invention is preferably added at this time, along with a portion of the bulking agent. Further portions of the bulking agent may then be added to the mixer. A flavoring agent is typically added with the final portion of the bulking agent.

The entire mixing procedure typically takes from five to fifteen minutes, but longer mixing times may sometimes be required. Those skilled in the art will recognize that many variations of the above described procedure may be followed.

The following basic gum formula is used in the gum example that follows and in formulating a control gum used for testing the gum composition using the syrup of the present invention:

| Gum Composition | |
| --- | --- |
| base | 25.48% |
| sorbitol | 49.25 |
| mannitol | 7.97 |
| glycerin | 6.26 |
| spearmint flavor | 1.44 |
| lecithin | 0.21 |
| aspartame | 0.23 |
| color | 0.05 |
| syrup | 9.11 |
| | 100.00 |

EXAMPLE 2 (GUM)

Chewing gum of Example 2 was made using the above formula, with the syrup being the syrup of Example 1.

In the control gum, the syrup comprised 67.5% Lycasin brand HSH solids, 25% glycerin and 7.5% water. Accounting for the small amount of water in the glycerin, and considering that the HSH solids are 52% maltitol, the major ingredients of the syrups used in the gums was as follows:

| | Example 2 | Control |
| --- | --- | --- |
| glycerin | 24.75% | 24.75% |
| water | 7.75 | 7.75 |
| maltitol | 47.1 | 35.1 |
| other alditols | 20.4 | 32.4 |

The maltitol made up 69.8% of the total alditols in the syrup used in the Example 2 gum, and 52% of the alditols in the syrup used in the control gum.

The gum of Example 2 was tested against the control gum for moisture loss/absorbance by placing both gums in controlled environments of 0% and 71% relative humidity (RH), both at 72° F. The samples were weighed periodically to determine whether moisture was lost or gained, with the following results:

| | | % Moisture Gain or Loss (by weight of the entire gum composition) | |
| --- | --- | --- | --- |
| 90 days Gum | 14 day Syrup | % Loss at 0% RH | % Gain at 71% RH |
| Control gum | HSH/glycerine | 1.24 | 12.67 |
| Example 2 | Example 1 | 0.99 | 11.92 |

As can be seen, the gum of Example 2 out-performed the control at both RH conditions. Note that the difference at 0% RH seems small, but since very little moisture was present initially, this difference is significant.

What is most interesting is the surprising result that the Example 1 syrup with added maltitol resulted in a gum that lost less moisture in the low humidity environment and gained less moisture in the high humidity environment than the gum using the prior art syrup.

It should be appreciated that the compositions and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

We claim:

1. A method of preparing a chewing gum composition comprising the steps of:
   a) providing a syrup comprising
      i) from about 10% to about 40% of a plasticizer selected from the group consisting of glycerin, propylene glycol and mixtures thereof;
      ii) from about 40% to about 85% alditols, with at least 65% of the alditols consisting of maltitol; and
      iii) from about 5% to about 35% water;
   b) providing a chewable gum base, a bulking agent selected from the group consisting of sugars, sugar alcohols and mixtures thereof; optional flavors, artificial sweeteners, colors, preservatives and processing aids; and
   c) combining the gum base in an amount from about 10% to about 60% by weight of the chewing gum composition, the bulking agent in an amount from about 20% to about 70% by weight of the chewing gum composition, the syrup in an amount from about 4% to about 25% by weight of the chewing gum composition and the optional ingredients to from a finished chewing gum composition.

2. The method of claim 1 wherein the plasticizer comprises from about 15% to about 25% of the syrup.

3. The method of claim 1 wherein the water comprises from about 5% to about 15% of the syrup.

4. The method of claim 3 wherein the plasticizer comprises from about 15% to about 25% of the syrup.

5. A chewing gum made in accordance with the method of claim 1.

6. A chewing gum made in accordance with the method of claim 4.

7. A chewing gum made in accordance with the method of claim 2.

8. A low moisture syrup for use in chewing gum comprising:
   a) from about 10% to about 40% of a plasticizer selected from the group consisting of glycerin, propylene glycol and mixtures thereof;
   b) from about 40% to about 85% alditols, with at least 65% of the alditols (by weight of the alditols) consisting of maltitol; and
   c) from about 5% to about 35% water.

9. The syrup of claim 8 wherein the plasticizer comprises from about 15% to about 25% of the syrup.

10. The syrup of claim 8 wherein the water comprises from about 5% to about 15% of the syrup.

11. The syrup of claim 10 wherein the plasticizer comprises from about 15% to about 25% of the syrup.

12. A method of making a low moisture syrup for use in chewing gum comprising mixing
   a) from about 10% to about 40% of a plasticizer selected from the group consisting of glycerin, propylene glycol and mixtures thereof;
   b) from about 40% to about 85% alditols, with at least 65% of the alditols (by weight of the alditols) consisting of maltitol; and
   c) from about 5% to about 35% water; to create a homogeneous syrup.

13. The method of claim 12 the plasticizer, alditols and water are heated to affect dissolution of the alditols.

14. The method of claim 12 wherein the majority of the water is provided with the alditols in the form of an alditol syrup and the mixture is heated to evaporate water from the mixture to reach a desired moisture content for the syrup.

15. A method of preparing a chewing gum composition comprising the steps of:
   a) providing a syrup comprising
      (i) from about 10% to about 40% of a plasticizer selected from the group consisting of glycerin, propylene glycol and mixtures thereof;
      (ii) from about 40% to about 85% alditols, with at least about 70% of the alditols consisting of maltitol; and
      (iii) from about 5% to about 35% water;
   b) providing a chewable gum base, a bulking agent selected from the group consisting of sugars, sugar alcohols and mixtures thereof; optional flavors, artificial sweeteners, colors, preservatives and processing aids; and
   c) combining the gum base in an amount from about 10% to about 60% by weight of the chewing gum composition, the bulking agent in an amount from about 20% to about 70% by weight of the chewing gum composition, the syrup in an amount from about 4% to about 25% by weight of the chewing gum composition and the optional ingredients to form a finished chewing gum composition.

16. The method of claim 15 wherein the plasticizer comprises from about 15% to about 25% of the syrup.

17. The method of claim 15 wherein the water comprises from about 5% to about 15% of the syrup.

18. The method of claim 17 wherein the plasticizer comprises from about 15% to about 25% of the syrup.

19. A chewing gum made in accordance with the method of claim 15.

20. A chewing gum made in accordance with the method of claim 18.

* * * * *

UNITED STATES PATENT AND TRADEMARK OFFICE
CERTIFICATE OF CORRECTION

PATENT NO. : 5,120,551
DATED : June 9, 1992
INVENTOR(S) : Robert J. Yatka, et al.

It is certified that error appears in the above-indentified patent and that said Letters Patent is hereby corrected as shown below:

In column 1, lines 8 and 9, please delete "carbohydrates" and substitute therefor --carbohydrate--.

In column 6, line 17, please delete "and" and substitute therefor --_and_--.

In claim 1, line 23, please delete "from" and substitute therefor --form--.

UNITED STATES PATENT AND TRADEMARK OFFICE
CERTIFICATE OF CORRECTION

PATENT NO. : 5,120,551

DATED : June 9, 1992

INVENTOR(S) : Robert J. Yatka et al.

It is certified that error appears in the above-identified patent and that said Letters Patent is hereby corrected as shown below:

In claim 13, line 1, after "12" please insert --wherein--.

Signed and Sealed this

Seventh Day of September, 1993

Attest:

BRUCE LEHMAN

*Attesting Officer*     *Commissioner of Patents and Trademarks*